J. T. B. RHEINFELDT.
TURNING TOOL.
APPLICATION FILED AUG. 29, 1908.
931,889.
Patented Aug. 24, 1909.
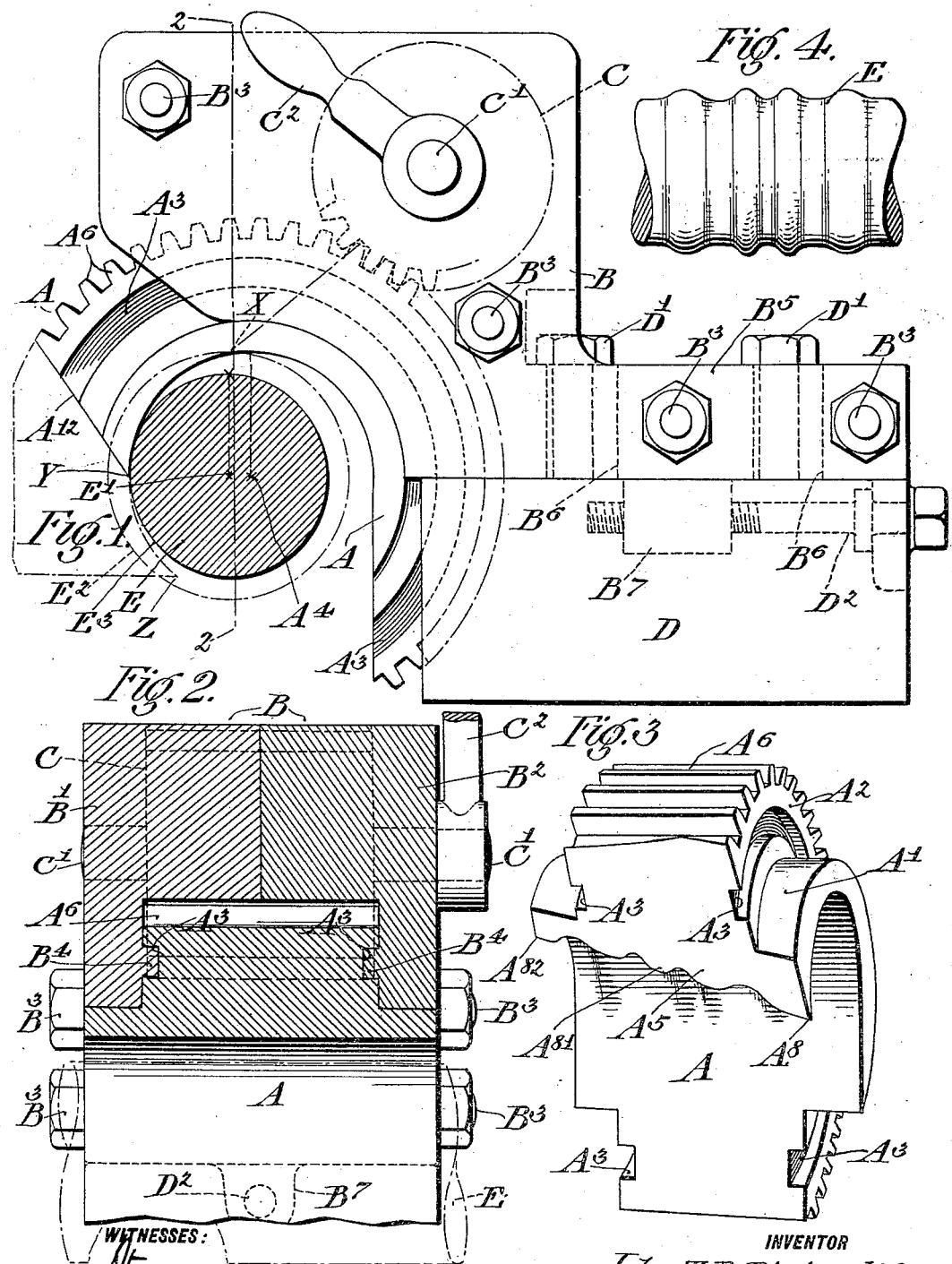

UNITED STATES PATENT OFFICE.

JOHN T. B. RHEINFELDT, OF PHILADELPHIA, PENNSYLVANIA.

TURNING-TOOL.

931,889.  Specification of Letters Patent.  Patented Aug. 24, 1909.

Application filed August 29, 1908. Serial No. 450,892.

*To all whom it may concern:*

Be it known that I, JOHN T. B. RHEINFELDT, a citizen of the United States, residing in the city and county of Philadelphia, in the State of Pennsylvania, have invented a certain new and useful Improvement in Turning-Tools, of which the following is a true and exact description, reference being had to the accompanying drawings, which form a part thereof.

My present invention relates to turning tools and feeding mechanism therefor.

The object of the invention is to provide a tool so shaped and arranged and mechanism for so advancing the tool into the work during each cutting operation that the tool will engage the work at a proper cutting angle throughout the cutting operation, will operate without chattering even when the tool is provided with an extended cutting edge, and will be well adapted to resist the stresses encountered in operation.

A further object of the invention is to provide a simple compact and reliable mechanism for attaining the objects first enumerated.

In the form of carrying out the invention disclosed, I have accomplished the various objects sought by the form which I have given to the tool and by the mechanism which I have provided for feeding the tool into the work. The tool shown is in the form of a segmental arc, and I have provided simple and effective mechanism for rotating the tool to feed it into the work about an axis so located that each point in the cutting edge may travel in an arc concave toward the center line of the work and having a radius of curvature greater than the radius of the portion of the work finished by said cutting point, and have so arranged the tool and its supporting mechanism that the work may be brought into the position in which it is traversed by the axis of movement of the tool, so that the distance between the center line of the work and the axis of movement of the tool is less than the radial distance between the axis of movement and the cutting edge. In the tool shown, the extended cutting edge of the tool is generally oblique to the axis about which the tool is turned.

The various features of novelty which characterize my invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which the invention may be embodied.

Of the drawings: Figure 1 is a side elevation of the tool and feeding mechanism therefor. Fig. 2 is a section taken on the line 2—2 of Fig. 1. Fig. 3 is a perspective view of the tool shown in Figs. 1 and 2; and Fig. 4 is an elevation of a portion of the work which may be formed by the tool shown in Figs. 1, 2 and 3.

In the form of the invention shown in the drawings, A represents the turning tool for turning the rotating work E, and B the holder for the tool.

The tool A comprises a body portion $A^1$ and a guide rib $A^2$ having grooves or guideways $A^3$ formed in its edges. The body $A^1$ and rib $A^2$, as well as the grooves $A^3$, are in the form of segmental arcs, the common axis of curvature of which is indicated in Fig. 1 by the point $A^4$.

$A^5$ represents the chip engaging face of the tool.

The rib $A^2$ is provided on its periphery with gear teeth $A^6$.

The holder B in the form shown comprises two parts $B^1$ and $B^2$ clamped together by bolts $B^3$. The holder B is provided with a recess receiving the rib $A^2$ and with curved guides or ribs $B^4$, which enter the grooves $A^3$, and also with a chamber in which is mounted a spur gear C meshing with the gear teeth $A^6$. The spur gear is secured to a spindle $C^1$ journaled in the holder B and provided with an operating handle $C^2$, by means of which the tool may be turned in the holder about the axis $A^4$.

The holder B is stationary during any given turning operation and may be mounted on any suitable support, as the turret of a turret lathe or the tool carriage of an ordinary lathe. In the form shown, the holder is provided with an extension $B^5$ adapted to be clamped to a tool carriage or other support D by bolts $D^1$ passing through slots $B^6$ in the extension $B^5$. When these bolts $D^1$ are loosened, the support may be moved bodily toward and away from the work E by an adjusting screw $D^2$ which is journaled in the support D and is threaded through a threaded lug $B^7$ formed on the under side of the extension $B^5$. It is to be understood, however, that the bodily adjustment of the holder B is only for the purpose of setting the tool into different positions to operate on work of different diameters and is not for the purpose of feeding the tool during any one cutting operation. The feed of the tool into a piece of work is accomplished by turning the tool about the axis $A^4$.

In Fig. 1, the point $E^1$ represents the axis of the work E and the work center line of the lathe as well, and $E^2$ and $E^3$ the rough and finished peripheries of the portion of the work acted on by the point $A^8$ of the cutting edge of the tool. The arc X Y Z represents the path of the point $A^8$ as the tool is turning about the axis $A^4$ and it will be observed that the arc X Y Z intersects the periphery $E^2$ at the point X, and touches the periphery $E^3$ only at the point Y, where the line connecting the points $A^4$ and $E^1$ cuts the periphery $E^3$. The arc X Y Z, if extended, would intersect the periphery $E^3$ at a point on the other side of the point Y from the point X and at a distance from the point Y equal to the distance between points Y and X.

It is clear from the drawings that the arc X Y Z must not only have its concave side toward the work but must have a radius of curvature greater than the radius of the circle $E^3$. In practice, in order to have the tool properly clear the work, I prefer to make the distance $A^4$ $E^1$ slightly greater than the difference between the radii of the circles $E^2$ and $E^3$ or rather I make it slightly greater than the maximum depth of cut which it is desired to take with the tool.

By making the cutting edge not parallel but oblique to the axis $A^4$, I insure that different points, $A^8$, $A^{81}$, $A^{82}$ etc. in the cutting edge shall commence and complete their cutting movements at different times and this is highly advantageous in preventing chattering of the tool and in avoiding injurious strains. At the same time, the operation of grinding the tool is a comparatively simple one even though, as is usually the case, the inner surface of the tool is not a simple cylinder but is formed with ribs and grooves in order to produce work of the character shown in Fig. 4.

By making the tool arc shaped and of an internal diameter not much greater than the rough diameter of the work to be operated on, I obtain a tool which is strong and well adapted to resist the strains of the cutting operation.

A material advantage of the feed described is that the cutting angle, i. e. the angle between the line $A^{12}$ and the tangent to the work at any cutting point as $A^8$, changes only slightly during the entire cutting operation of such. It will be understood that this angle should be constant for all points along the cutting edge of the tool.

It is apparent from an inspection of Fig. 1 that the smaller the distance between the points $A^4$ and $E'$, the less is the change in cutting angle produced as the cutting edge moves through the quadrant between X and Y. I prefer, however, to make the distance $A^4$ $E'$ a little greater than the maximum depth of cut which it is desired to take with the tool, since in practice the change in cutting angle is always relatively small with the character of feed described, where the distance between points $A^4$ and $E'$ is always substantially less than the radius of curvature of the path of the cutting edge. By making the distance $A^4$ $E'$ a trifle greater than the maximum depth of cut which it is desired to take with the tool, a compact tool and feeding mechanism is had, while at the same time a proper clearance is obtained with a tool of a shape well adapted to resist the strains of the cutting operation.

Having now described my invention, what I claim as new and desire to secure by Letters Patent is:

1. A turning tool, in the form of a segmental arc, having its ends spaced apart, and having its cutting edge at the intersection of its inner curved surface with one end surface of the arc, said end surface extending obliquely of the arc and serving as the chip engaging surface of the tool.

2. A turning tool, in the form of a segmental arc, having its ends spaced apart, and having its inner curved surface grooved to give an irregular contour to the work operated upon, and having its cutting edge at the intersection of said inner curved surface with one end surface of the arc, said end surface extending obliquely to the axis of curvature of the arc and serving as the chip engaging surface of the tool.

3. The combination with a turning tool, of a holder therefor, said tool and holder being provided with coacting devices whereby the tool may be fed into the work by turning the tool relative to the holder to carry the cutting edge of the tool through a circular path so located relative to the contour of the holder and the tool that the work being acted upon by the tool may extend into a position in which it is traversed by the axis of said circular path.

4. The combination with a turning tool, of a holder therefor, said tool and holder being provided with coacting curved guides and guide ways whereby the tool may be fed into the work by moving the tool relative to the holder to carry the cutting edge of the tool through a circular path so located relative to the contour of the holder and the tool that the work being acted upon by the tool may extend into a position in which it is traversed by the axis of said circular path, and means for moving the tool relative to the holder.

5. The combination with a turning tool, of a holder therefor, said tool and holder being provided with coacting devices whereby the tool may be fed into the work by turning the tool relative to the holder to carry the cutting edge of the tool through a circular path, said tool being concaved toward the axis of said circular path, and the latter being so located relative to the contour of the holder that the work being acted upon may extend into a position in which it is traversed by the axis of said circular path.

6. The combination with a turning tool, provided with a gear segment, of a holder for the tool, said tool and holder being provided with coacting devices whereby the tool may be fed into the work by turning the tool relative to the holder to carry the cutting edge of the tool through a circular path so located relative to the contour of the holder and the tool that the work being acted upon by the tool may extend into a position in which it is traversed by the axis of said circular path, a gear mounted in the holder and meshing with the gear segment, and means for rotating said gear to turn the tool relative to the holder.

7. The combination with an arc shaped turning tool, of a holder therefor, said tool and holder being provided with coacting devices whereby the tool may be fed into the work by turning the tool relative to the holder to carry the cutting edge of the tool through a circular path about an axis substantially coincident with the axis of curvature of the tool and so located relative to the contour of the holder that the work being acted upon by the tool may extend into the concavity of the tool and into a position in which it is traversed by the axis of said circular path.

8. The combination with the tool support of a lathe, of a tool connected to said support and adapted to swing relatively thereto about an axis located at a distance from the work center line of the lathe, said distance being substantially less, however, than the distance between said axis and the cutting edge of the tool.

9. The combination with the tool support of a lathe, of a tool holder mounted thereon and adjustable toward and away from the work center line of the lathe, a tool mounted in said holder to move relatively thereto about an axis parallel to the work center line of the lathe and separated from said center line by a distance, said distance being substantially less, however, than the distance between said axis and the cutting edge of the tool.

JOHN T. B. RHEINFELDT.

Witnesses:
 ARNOLD KATZ,
 D. STEWART.